United States Patent
Kopp (10) Patent No.: US 10,189,459 B2
(45) Date of Patent: Jan. 29, 2019

(54) METHOD FOR OPERATING A VEHICLE

(71) Applicant: Audi AG, Ingolstadt (DE)

(72) Inventor: Andreas Kopp, Kösching (DE)

(73) Assignee: AUDI AG, Ingolstadt, München ( * ) Notice: Subject to any disclaimer, the term of this patent is extended or adjusted under 35 U.S.C. 154(b) by 148 days.

(21) Appl. No.: 15/309,730

(22) PCT Filed: May 7, 2015

(86) PCT No.: PCT/EP2015/000939
§ 371 (c)(1),
(2) Date: Nov. 8, 2016

(87) PCT Pub. No.: WO2015/169448
PCT Pub. Date: Nov. 12, 2015

(65) Prior Publication Data
US 2017/0267226 A1    Sep. 21, 2017

(30) Foreign Application Priority Data
May 9, 2014  (DE) ........................ 10 2014 006 898

(51) Int. Cl.
*B60W 10/02*   (2006.01)
*B60W 10/11*   (2012.01)
(Continued)

(52) U.S. Cl.
CPC ............ *B60W 10/02* (2013.01); *B60W 10/11* (2013.01); *B60W 10/12* (2013.01);
(Continued)

(58) Field of Classification Search
CPC .. B60W 10/02; B60W 10/12; B60W 2710/12; B60W 2520/10; B60W 2520/28;
(Continued)

(56) References Cited

U.S. PATENT DOCUMENTS

| 2002/0002436 A1 * | 1/2002 | Nishida | B60K 17/35 701/72 |
| 2004/0138027 A1 | 7/2004 | Rustige et al. | |

(Continued)

FOREIGN PATENT DOCUMENTS

| CN | 103661382 A | 3/2014 |
| DE | 102 21 701 | 11/2002 |

(Continued)

OTHER PUBLICATIONS

International Search Report issued by the European Patent Office in International Application PCT/EP2015/000939 dated Sep. 9, 2015.

(Continued)

*Primary Examiner* — David J Hlavka
(74) *Attorney, Agent, or Firm* — Henry M. Feiereisen LLC (57) ABSTRACT

A method for operating a vehicle is disclosed. The vehicle has at least one torque transmission device which when rotating splashes in a fluid, at least two axles each having at least two wheels and at least one controllable coupling device adapted for selectively coupling or decoupling the torque transmission device with at least one of the wheels. The method includes the steps of: in an operating state in which no torque is requested by a driver of the vehicle, decoupling with the control device the torque transmission device and the at least one wheel when a driving speed of the vehicle is greater than or equal to a predetermined speed threshold value and coupling with the control device the torque transmission device and the at least one wheel for torque transmission when the driving speed is smaller than the predetermined speed threshold value.

7 Claims, 4 Drawing Sheets

(51) Int. Cl.
*B60W 30/18* (2012.01)
*B60W 10/12* (2012.01)
*F16D 48/06* (2006.01)
*F16H 61/14* (2006.01)
*B60K 17/02* (2006.01)
*B60K 17/35* (2006.01)
*F16D 13/72* (2006.01)
*F16D 13/74* (2006.01)
*F16H 57/04* (2010.01)

(52) U.S. Cl.
CPC ....... *B60W 30/18072* (2013.01); *F16D 48/06* (2013.01); *F16H 61/143* (2013.01); *B60K 17/02* (2013.01); *B60K 17/35* (2013.01); *B60W 2520/10* (2013.01); *B60W 2520/28* (2013.01); *B60W 2710/025* (2013.01); *B60W 2710/12* (2013.01); *F16D 13/72* (2013.01); *F16D 13/74* (2013.01); *F16H 57/04* (2013.01); *F16H 2061/145* (2013.01); *Y02T 10/52* (2013.01); *Y02T 10/84* (2013.01)

(58) Field of Classification Search
CPC ............ B60W 2710/025; F16H 61/143; F16H 2061/145; F16H 57/04; F16D 48/06; F16D 13/74; F16D 13/72; B60K 17/35; B60K 17/02
See application file for complete search history.

(56) References Cited

U.S. PATENT DOCUMENTS

| | | |
|---|---|---|
| 2007/0193808 A1 | 8/2007 | Perakes et al. |
| 2008/0195288 A1 | 8/2008 | Burkhart et al. |
| 2013/0073158 A1 | 3/2013 | Guegan et al. |
| 2014/0067219 A1* | 3/2014 | Stares ................ B60K 17/34 701/69 |
| 2014/0080673 A1* | 3/2014 | Stares ................ B60K 17/34 477/174 |
| 2014/0100750 A1* | 4/2014 | Stares ................ B60K 17/34 701/69 |
| 2016/0347171 A1* | 12/2016 | Ogawa ............... B60W 40/114 |

FOREIGN PATENT DOCUMENTS

| | | |
|---|---|---|
| DE | 102005024757 | 12/2006 |
| DE | 102008022939 | 10/2009 |
| DE | 102010052385 | 6/2011 |
| DE | 102010046235 | 3/2012 |
| DE | 102011082893 | 3/2013 |
| WO | WO 2011/006571 | 1/2011 |

OTHER PUBLICATIONS

Chinese Search Report dated Apr. 4, 2018 with respect to counterpart Chinese patent application 2015800246362.

Translation of Chinese Search Report dated Apr. 4, 2018 with respect to counterpart Chinese patent application 2015800246362.

\* cited by examiner

METHOD FOR OPERATING A VEHICLE

CROSS-REFERENCES TO RELATED APPLICATIONS

This application is the U.S. National Stage of International Application No. PCT/EP2015/000939, filed May 7, 2015, which designated the United States and has been published as International Publication No. WO 2015/169448 and which claims the priority of German Patent Application, Serial No. 10 2014 006 898.6, filed May 9, 2014, pursuant to 35 U.S.C. 119(a)-(d).

BACKGROUND OF THE INVENTION

The invention relates to a method for operating a vehicle having at least one torque transmission device, which when rotating splashes in a fluid, and at least two axles which each have two wheels and with at least one controllable coupling device by means of which the torque transmission device and at least one of the wheels can be selectively coupled or decoupled for torque transmission.

From the published patent document U.S. 2007/0193808 A1 a control method for the drivetrain of a vehicle with a secondary drive axle, which can be decoupled from the drivetrain, is known. According to this reference the secondary drive axle is decoupled from the drivetrain for saving fuel, when the vehicle speed is above a predetermined speed threshold value. When the vehicle speed is below the predetermined speed threshold value the secondary drive axle is connected with the drivetrain in order to enhance the effect of the regenerative braking.

From the published patent document DE 10 2005 024 757 A1 a method for activating and deactivating the all-wheel-drive in emergency vehicles and working machines, which have no longitudinal locks, is known. According to this reference the all-wheel-drive is activated when the vehicle speed falls below a predetermined threshold value and the transmission output torque exceeds a predetermined threshold value. It is further provided that the all-wheel-drive is deactivated when the vehicle speed exceeds a predetermined threshold value or when the transmission output torque falls below a predetermined threshold value.

SUMMARY OF THE INVENTION

It is an object of the present invention to provide an operating method in a vehicle of the aforementioned type by means of which energy consumption can be reduced. In particular fuel consumption and pollutant emission in a vehicle with internal combustion engine is sought to be reduced and in a vehicle with an electric machine the consumption of electrical energy is sought to be reduced.

This object is solved with the method according to the independent claim. Advantageous embodiments of the method are the subject matter of the dependent claims.

The method according to the independent claim relates to a vehicle of the aforementioned type. In an operating state in which no torque request from the driver is present, the torque transmission device and the at least one wheel are decoupled when the vehicle speed of the vehicle is greater or equal to a predetermined speed threshold value. When the vehicle speed is smaller than the predetermined speed threshold value the torque transmission device and the at least one wheel are coupled for torque transmission.

The term transmission device within the context of the invention means rotatably supported components in the drivetrain (operative connection from the drive motor to the wheel) of the vehicle, which are configured for transmitting a torque along the drive train. Transmission devices may include, solely by way of example, coupling devices (form-fitting or friction based, preferably wet clutches), the rotating elements of a torque converter of an automatic transmission or the rotating elements of a distribution gear (differential). The torque transmission device has at least one rotatably supported element, which when rotating splashes in a fluid and thereby performs displacement work. The fluid can for example be oil, which serves for lubricating and/or cooling the torque transmission device.

The term operating state of the vehicle within the context of the invention is any state of the vehicle in which the vehicle moves, i.e. rolls and is not stationary. The driver requests a torques, i.e., the desired drive work or drive power of the vehicle, preferably via an operating element that the driver can influence, for example a gas pedal. When no torque request from the driver is present this operating element is idle.

The speed threshold value can be stored in the memory of an electronic control device as a fixedly applicable value or can be calculated variably from a characteristic curve in dependence on operating parameters.

The invention is based on two effects that reduce the consumption of propulsion energy of the vehicle.

On one hand it is advantageous to use gained kinetic energy for traveling over a greatest possible distance when no torque request by the driver is present. In order to achieve this it is sought to reduce driving resistances, in particular vehicle inherent friction resistances.

On the other hand it is advantageous that fluids, which are in contact with moved components of the vehicle and at low temperatures present a significant resistance against the parts that are moved in these fluids, are quickly brought to operating temperature. With regard to the invention this means that the torque transmission device or its rotating components, which when rotating splash in the fluid, perform greater displacement work at lower operating temperatures of the flute due to the higher viscosity then at higher operating temperatures of the fluid. These higher losses and lower temperatures have to be additionally generated by a drive motor of the vehicle in order to satisfy a torque request or a power request of the driver. This power additionally generated by the drive motor results in increased fuel consumption, and increased pollutant emission and a reduced range. Therefore it is desirable to heat the fluid as fast as possible to a higher temperature and to avoid subsequent lowering of the temperature. This can for example be achieved by intentionally causing the torque transmission device to rotate or to increase the rotation speed of the torque transmission device in order to thereby increase the heat input into the fluid caused by the displacement work.

These two contradictory aspects are used in a very advantageous manner by the method according to the invention. Accordingly at a vehicle speed above the speed threshold value the torque transmission device and the at least one wheel are decoupled, whereupon the torque transmission device is no longer dragged by the rotating wheel. As a result the torque transmission device is decelerated, ideally until being stationary. As a result of this reduction of the rotation speed of the internal losses of the drivetrain generated by the displacement work are significantly reduced, which promotes the first aspect explained about. Limiting this measure to the speed range of the motor vehicle above the speed threshold value has the reason that the travel over greater distances by pure rolling (no torque request of the driver is present) is possible predominantly when driving on country roads or highways, i.e., at higher speeds and correspondingly extended roads. In contrast for traffic related reasons it is only rarely possible within city limits, i.e., at lower speeds, to travel over longer distances by letting the vehicle roll out. Therefore at a vehicle speed below the speed threshold value the torque transmission device and the at least one wheel are coupled for torque transmission, whereby the rotation and the splashing of the torque transmission device in the fluid is maintained or is even enhanced as a result of increasing the rotation speed. The increased displacement work enhances the heat input into the fluid and facilitates quickly reaching or maintaining higher operating temperatures of the fluids.

In this way in vehicles with internal combustion engine the fuel consumption and the pollutant emission is reduced. In vehicles with electric drive the consumption of electrical energy is reduced.

In an embodiment of the method according to claim 2 the torque transmission device is configured as a differential gear. The term differential gear means in particular a differential, for example an axle differential, which compensates unevennesses in the rotational speeds of the wheels of one axle. In this case the controllable coupling device can be configured as a positive clutch or a friction clutch, which is arranged in the force flux between the differential gear and one of the wheels.

In an embodiment of the method according to claim 3 the coupling device has an automated change speed transmission, wherein the at least one torque transmission device is assigned to the automated change speed transmission in order to couple the change speed transmission with a drive unit of the vehicle for torque transmission.

Hereby the automated change speed transmission can in particular be a stepped automatic transmission, a dual clutch transmission or an automated manual transmission. The drive unit can be an electric motor and/or an internal combustion engine.

In an embodiment of the method according to claim 4 the torque transmission device as at least one controllable clutch configured as a wet clutch for selectively coupling and decoupling the change speed transmission with the drive motor.

In a further embodiment of the invention according to claim 5, the at least one controllable clutch is controlled in the operating state in which no torque request of the driver is present, so that the change speed transmission and the drive unit are decoupled.

In this case there is thus no torque transmitting connection between the change speed transmission and the drive unit. The controllable clutch is hereby preferably configured as a wet friction clutch.

In a further embodiment of the method according to claim 6 at least one controllable clutch is configured as a friction clutch, wherein the friction clutch is caused to assume a slip state when the vehicle speed is smaller than the predetermined speed threshold value.

The term slip sate hereby means the targeted contacting of the friction elements of the friction clutch, wherein between the friction elements a relative movement or a rotational speed differential is maintained. The friction heat generated in this slip state is transmitted to the fluid in which the friction clutch splashes and serves for further accelerating the heating up. This achieves that the fluid reaches the operating temperature faster and thus the viscosity and the displacement work are reduced.

In an embodiment of the method, the torque transmission device has at least one torque converter.

In an embodiment of the method, a gar of the change speed transmission is engaged for coupling the toque transmission device and the at least one wheel for torque transmission.

Hereby in an embodiment, a gear with a greatest possible transmission ratio is engaged.

As a result of engaging a gear, in particular a gear with a greatest possible transmission ratio, a force transmission between the torque transmission device and the wheel is established. As a result thereof the torque transmission device is dragged by the at least one wheel the rotational speed of the torque transmission device is increased, displacement work is performed as a result of the splashing in the fluid and heat is generated. The torque transmitting coupling by engaging a gear is a particularly elegant and simple approach because in automated transmissions the engagement of a gear can be performed independent of the driver by a control device. As a result of the engagement of a gear with a greatest possible transmission ratio a very high rotational speed of the torque transmission device can be achieved and the heat production in the fluid can be accelerated. For selecting the gear to be engaged, aspects of comfort (noise generation) and aspects of component protection have to be taken into account.

In an embodiment of the method, the gear is also engaged when a driver selects a neutral position of the change speed transmission by means of an operating device and/or when a switching condition for switching the change speed transmission into the neutral position is satisfied, which switching condition is dependent on operating conditions of the vehicle and is verified by a control device assigned to the change speed transmission.

This embodiment of the method relates to an operating condition of the vehicle in which either the driver via a corresponding operating device (for example a selector lever of the change speed transmission) or a control function, which is stored in the control device in the form of software, requests a change of the change speed transmission into the neutral position. The term neutral position means the disengagement of all gears of the change speed transmission. The particularly advantageous effect of this embodiment of the method is that the request for changing the change speed transmission into the neutral position is ignored and the gear is nevertheless engaged or remains engaged. Thus the positive effects described in connection with claim 1 are achieved by the fast heating up of the fluid.

In an embodiment of the method, the torque transmission device and the at least one wheel are only coupled for torque transmission when the driving speed is smaller than the predetermined speed threshold value and a temperature of the vehicle is smaller than a predetermined temperature threshold.

This embodiment of the method takes into account that these fluid-heating measures are only useful to the extent that the temperature of the fluid is below a predetermined temperature threshold value. When the fluid has reached a defined operating temperature the coupling of the torque transmission device of the at least one wheel is no longer performed because in this case the traveling over a greatest possible distance by rolling out the vehicle is regarded as useful.

BRIEF DESCRIPTION OF THE DRAWING

In the following the invention is described in more detail by way of the included drawings. In the Figures it is shown in.

Figure 1:
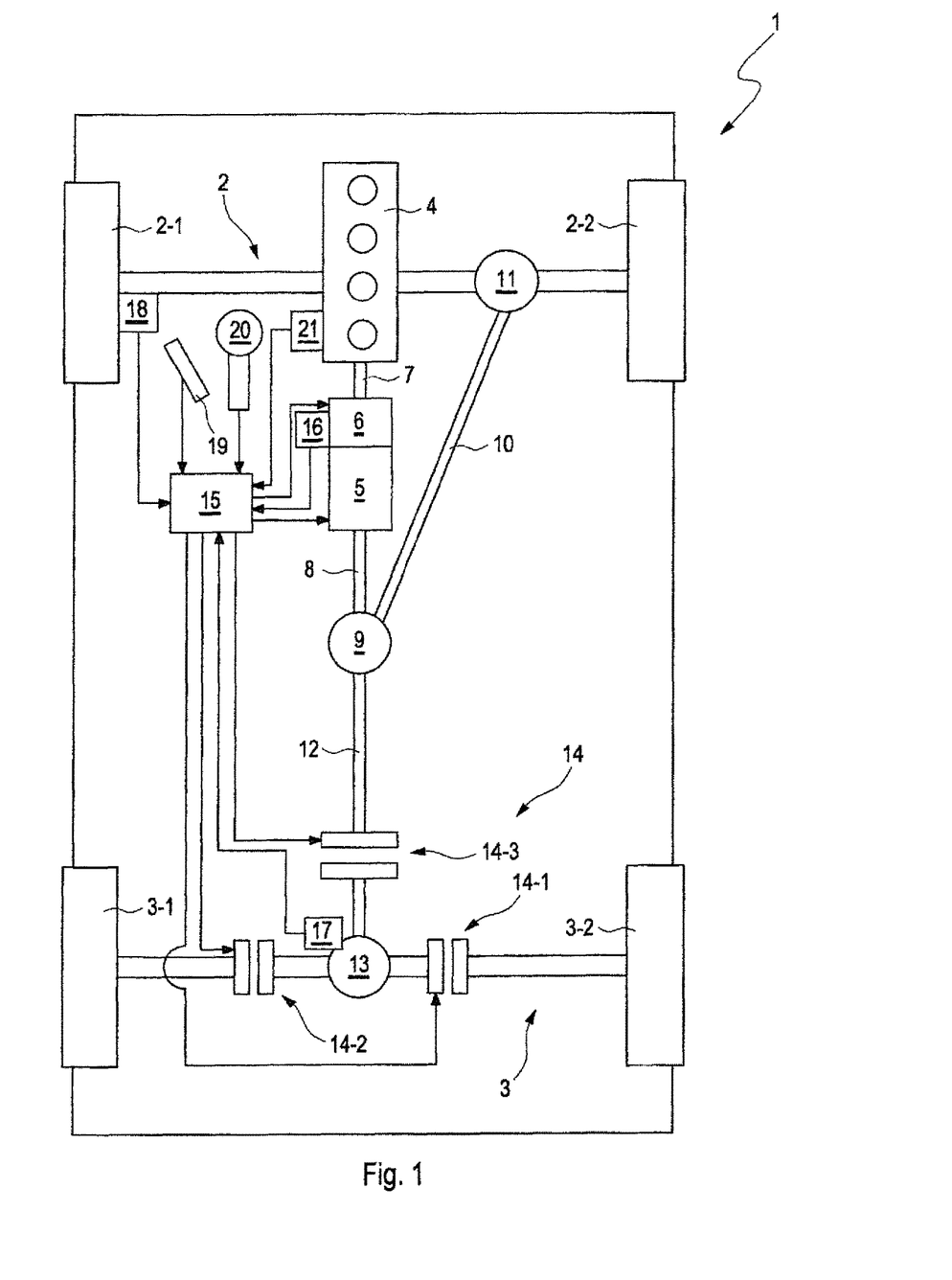
FIG. 1 a schematic representation of a vehicle

FIG. 1 schematically shows a vehicle 1. For reasons of better illustration only those components are shown that are required for explaining the invention.

DETAILED DESCRIPTION OF PREFERRED EMBODIMENTS

The vehicle 1 has a front axle 2 and a rear axle 3, each having two wheels 2-1, 2-2 and 3-1, 3-2. The vehicle 1 has further a drive unit 4 in the form of an internal combustion engine or an electric motor, a first controllable coupling device 5 in the form of an automated change speed transmission and a first torque transmission device 6 assigned to the change speed transmission. The automated change speed transmission 5 is in particular an automatically controlled dual clutch transmission or a so-called stepped automatic transmission. In the case of the dual clutch transmission the assigned first torque transmission device 6 is configured as a wet dual clutch of known construction. In the case of the stepped automatic transmission the assigned first torque transmission device 6 is configured as torque converter of known construction.

The first torque transmission device 6, be it the dual clutch or the torque converter, have rotatingly supported components (coupling discs in the dual clutch; pump and turbine in the stepped automatic transmission), which upon rotation splash in a fluid. In the case of the dual clutch the fluid in particular serves for lubrication and cooling of the clutch discs, while the fluid in the torque converter predominantly serves for hydrodynamic force transmission.

The drive unit 4 is coupled with the first torque transmission device 6 for torque transmission. The first torque transmission device 6 serves for coupling and decoupling of the drive unit 4 and the first coupling device 5 (change speed transmission).

A first intermediate shaft 8 connects the change speed transmission 5 with an intermediate differential 9. The intermediate differential 9 is connected via a second intermediate shaft 10 with a front differential 11, which is arranged on the front axle and via a third intermediate shaft 12 with a rear differential 13 arranged on the rear axle. The intermediate differential 9, the front differential 11 and the rear differential 13 are configured as differential of known construction.

The rear differential 13 can be regarded as a second torque transmission device 13 of the vehicle 1. Also the second torque transmission device 13 includes components or elements which are rotatingly supported and upon rotation splash in a fluid, in particular a lubricating oil.

The vehicle 1 also has a second controllable coupling device 14, which has at least one controllable clutch, in the exemplary embodiment three controllable clutches 14. The clutches 14 are arranged on the third intermediate shaft 12 and on the opposite sides of the rear differential 13 on the subaxles of the rear axle 3. By means of the second controllable coupling device 14, which can be configured as a friction clutch or a claw coupling, the rear differential 13 and the wheels of the vehicle 1 can be selectively coupled or decoupled for torque transmission.

The vehicle 1 further has a control device 15, which is connected with the first torque transmission device 6, the second torque transmission device 13, the first coupling device 5, the second coupling device 14, a temperature sensor 16 for detecting the temperature of the first torque transmission device 6, a second temperature sensor 17 for detecting the temperature of the second torque transmission device 13, a speed sensor 18, a gas pedal 20 for a (not shown) driver for inputting a torque request, an operating device for the (not shown) driver for controlling the change speed transmission 5 and a temperature sensor 21 for detecting the temperature of the drive unit 4 via data and control lines (solid lines). The control device 5 receives the signals of the temperature sensors 16, 17 21, the speed sensor 18, the gas pedal 19 and the operating device 20.

In the control device 15 control functions and control algorithms and characteristic curves are stored in the form of software, on the basis of which the control device 15 controls actuators and other functional elements of the drive unit 4, the first coupling device 5, the second coupling device 14 and the first torque transmission device 6.

In particular control functions are stored in the control device 15 on the basis of which the control device 15 controls the first coupling device 5, the second coupling device 14 and the first torque transmission device 6 independent of the driver.

According to the invention, in an operating state in which no torque request by the driver is present, the first torque transmission device 6 or the second torque transmission device 13 and the wheels of the axles 2, 3 are decoupled by means of the first controllable coupling device 5 or the second controllable coupling device 14 when the driving speed of the vehicle 1 is greater than or equal to a predetermined speed threshold value.

When the driving speed of the vehicle 1 however is smaller than the predetermined speed threshold value the first torque transmission device 6 or the second torque transmission device 13 and the wheels of the axle 2, 3 are coupled by means of the first controllable coupling device 5 or the second controllable coupling device 14 for torque transmission.

The control device 15 hereby analyzes the signals of the speed sensor 18 and the gas pedal 19. An operating state of the vehicle is only present when the vehicle 1 is operated, i.e., moved. When the vehicle 1 is stationary no operating state within the scope of the invention is present. When the control device 15 recognizes that the driving speed is greater than 0 an operating state is present. A torque request by the driver is not present when the gas pedal 19 is recognized not to be actuated. The speed threshold value can be stored in the control device 15 as fixedly applicable variable or as a value that is variably calculated in dependence of operating parameters.

The control device 15 also tests the signals, which the driver sends via the electronic operating device 20. By means of the operating device 20 the driver can request various transmission ratios, reverse gear, neutral position or a parking position of the automatic change speed transmission 5. The term neutral position hereby means a state of the change speed transmission 5 in which no gear is engaged and thus no torque is transmitted in the transmission. The signals are provided to the control device 15, where they are analyzed and converted into control commands for the actuators of the change speed transmission 5.

In a further advantageous embodiment of the method, the first torque transmission device 6 and/or the second torque transmission device 13 and the wheels 2-1, 2-2, 3-1, 3-2 of at least one axle 2, 3 are coupled by means of the respectively assigned coupling device 5, 14 for torque transmission only when the driving speed is smaller than the predetermined speed threshold value and additionally a temperature of the vehicle 1, in particular the temperature of the fluid of the first torque transmission device 6 and/or the temperature of the fluid of the second torque transmission device 13, is smaller than a predetermined temperature threshold value stored in the control device 15. The respective temperatures are available to the control device 15 via the temperature sensors 16, 17.

Figure 2:
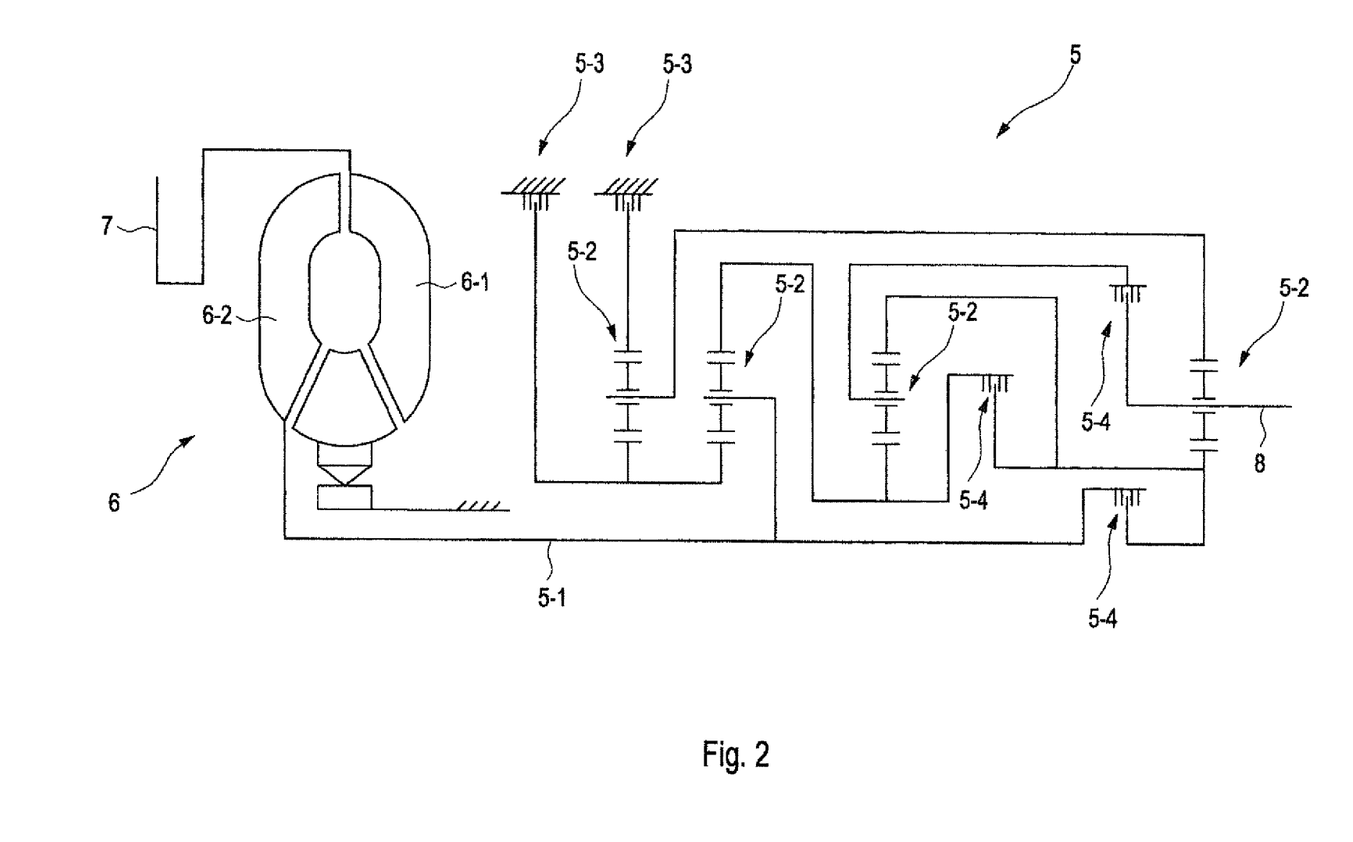
FIGS. 2 to 4 schematic representations of exemplary embodiments for torque transmission devices and assigned controllable coupling devices o the vehicle.

FIG. 2 schematically shows a first exemplary embodiment of the first torque transmission device 6 and the associated first coupling device 5. The first torque transmission device 6 is configured as a torque converter and is assigned of the first coupling device 5 which is configured as an automatic change speed transmission 6 (stepped automatic transmission).

The torque converter 6 is of known construction. A drive-side element, the so-called pump 6-1 is coupled with the internal combustion engine 4 (FIG. 1) via the output shaft 7 for torque transmission and is caused to rotate during operation of the internal combustion engine 4. The output side element, the turbine 6-2 can be coupled with the pump via a common fluid (not shown) for torque transmission. Upon rotation the pump 6-1 and the turbine 6-2 splash in the common fluid. As a result of the viscosity of the fluid a hydrodynamic force transmission between the pump 6-1 and the turbine 6-2 is possible. The turbine 6-2 is connected with an input shaft 5-1 of the change speed transmission 5 so that upon rotation of the turbine 6-2 also the input shaft 5-1 of the change speed transmission 5 is caused to rotate.

Also the stepped automatic transmission 5 is constructed in a known manner. It includes multiple planetary transmissions 5-2 housing-fixed, controllable brakes 5-3 and controllable clutches 5-3, which are operatively connected sot that when actuating the brakes 5-3 and clutches different transmission ratios can be realized. The output shaft of the stepped automatic transmission corresponds to the first intermediate shaft 8 as schematically shown in FIG. 1 and is coupled with the front axle 2 of the rear axle 3.

Figure 3:
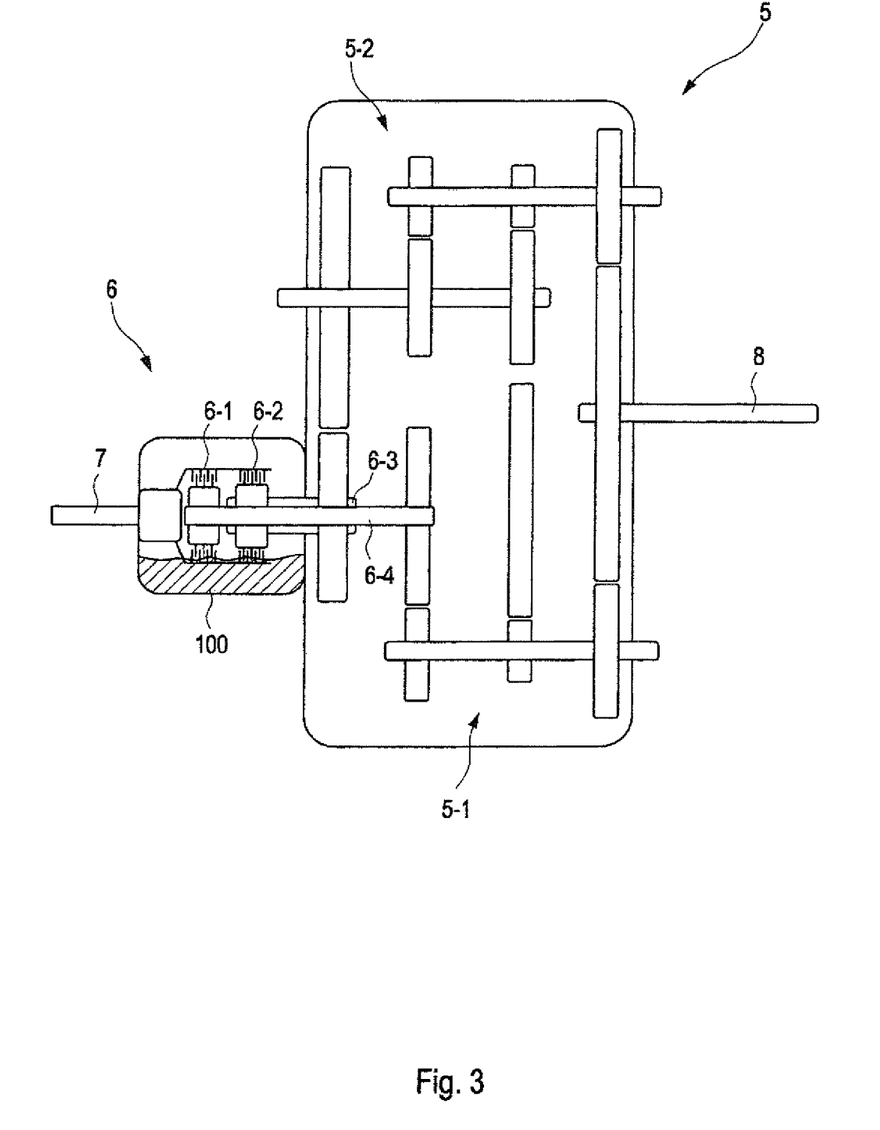

FIG. 3 schematically shows a second exemplary embodiment of the first torque transmission device 6 and the assigned first coupling device 5. The first torque transmission device 6 is constructed as a dual clutch in wet operation. The two clutches 6-1, 6-2 are preferably configured as multi disc clutches. The drive-side elements of the clutches are connected with the output shaft 7 of the drive unit 4 for torque transmission.

The change speed transmission 5 is configured as a dual clutch transmission of known construction. It has two sub transmissions 5-1, 5-2 (in FIG. 3 indicated by different shades of gray), wherein by means of the one sub transmission 5-1 the transmission stages of the uneven numbered gears and with the other subtransmission 5-2 the transmission stages of the even numbered gears can be realized. The two sub transmission 5-1, 5-2 are connectable with a common transmission output shaft (here the first intermediate shaft 8) for torque transmission, via which the torque is transmitted to the axles.

In the change speed transmission 5 each subtransmission 5-1, 5-2 has multiple sets of engaging gearwheel pairs, whereby different transmission ratios can be realized. The activation of the transmission stages is accomplished as known by electrical, pneumatic or hydraulically controlled selector rod (not shown) which act on positive clutches, which are mostly configured as sliding sleeve, and which generate depending on the desired transmission stage a force fit.

The selection and activation of the transmission stages (gears) of the change speed transmission 5 in FIGS. 2 and 3 is accomplished by the electronic control device, as schematically shown in FIG. 1.

The two clutches 6-1, 6-2 are each connected with one of the two subtransmissions 5-1, 5-2 via independently rotating shafts 6-3, 6-4, The shafts 6-3, 6-4 are, as known, arranged as hollow shaft and a solid shaft extending in the hollow shaft.

The clutches 6-1, 6-2 which are operated under wet operating conditions splash upon rotation in a fluid 100, wherein a lubrication and cooling is ensured.

In the following the operating method is explained by way of FIGS. 2 and 3.

In an operating state (during movement of the vehicle) in which no torque request by the driver is present (gas pedal not actuated) the first torque transmission device 6 of FIG. 2, which is configured as a torque converter, or the second torque transmission device 13 of FIG. 3, which is configured as a dual clutch, are respectively coupled with at least one wheel 2-1, 2-2, 2-3, 2-4 of the vehicle (see FIG. 1) for torque transmission when the driving speed of the vehicle 1 is smaller than the predetermined speed threshold value.

The coupling of the torque transmission device 5 with the at least one wheel is accomplished by means of the respectively assigned coupling devices 6.

In the exemplary embodiment of FIG. 2 the coupling is realized by engaging a gear of the change speed transmission 5, which is configured as a stepped automatic transmission.

In the exemplary embodiment of FIG. 3 the torque transmitting coupling is accomplished by engaging a gear of the change speed transmission 5, which is configured as dual clutch transmission. The two controllable clutches 6-1, 6-2 are hereby open so that the drive unit 4 and the change speed transmission 5 are decoupled.

With reference to FIG. 1 it can be seen that in this case the turbine 6-1 of the torque converter (FIG. 2) or the output-side element of the two clutches 6-1,I 6-2 is coupled with the wheels 2-1, 2-2 of the front axle 2 for torque transmission.

When the clutches 14 that are assigned to the differential 13 of the second axle are closed this torque transmitting coupling also applies to the wheels 3-1, 3-2 of the rear axle 3. In this way the turbine 6-1 of the torque converter 6 (FIG. 2) or the output-side element of the two clutches 6-1, 6-2 of the dual clutch 6 (FIG. 3) is dragged by the respective wheels 2-1, 2-2, 3-1, 3-2 and is thereby caused to rotate or the rotational speed is increased. As a result of this rotation the turbine 6-1 or the output-side element of the respective clutch 6-1, 6-2 of the dual clutch 6 perform increased displacement work in the fluid, which results in a noticeably increased heat input into the fluid. As a consequence the fluid heats up quickly and the viscosity is quickly reduced and drive losses are reduced faster.

For increasing this effect it is advantageous to achieve a greatest possible rotational speed of the turbine 6-1 or the output-side element of the clutch 6-1 6.2 by engaging a gear with a greatest possible transmission ratio. The term greatest possible transmission ratio means a transmission ratio, which can be set at an actual driving speed of the vehicle without causing damage to components as a result of excessive rotational speed. A further limitation can be the degree of noise that develops as a result of excessively fast rotation parts.

According to the method the torque transmission device, i.e., the torque converter 6 in FIG. 2 and the dual clutch 6 according to FIG. 3 and the wheels 2-1, 2-2, 3-1, 3-2 of the vehicle 1 are decoupled when the driving speed of the vehicle 1 is greater than or equal to the predetermined speed threshold value. In the exemplary embodiments of FIG. 2 or FIG. 3 this is realized in that all gears of the stepped automatic transmission 5 or all gears of the dual clutch transmission 5 are disengaged, which results in the situation that no torque transmitting connection between the torque converter 5 or the dual clutch transmission 5 and the respective wheels 2-1, 2-2, 3-1, 3-2 is present anymore.

In order to increase heat input into the fluid in the exemplary embodiment of FIG. 3, the clutch 6-1, 6-2, which is coupled with the wheels 2-1, 2-2, 3-1, 3-2, can be additionally caused to assume a slip state. The term slip state means to contact the input-side and the output-side elements (clutch discs) of the clutches without causing complete force transmission. As a result of the slipping of the output-side and input-side friction elements of the clutch, friction heat is generated which in turn is transmitted to the fluid and heats up the fluid.

In the exemplary embodiments of FIGS. 2 and 3 it is also advantageous when the gear is also engaged when the driver selects a neutral position of the respective change speed transmission 5 (stepped automatic transmission according to FIG. 2 and dual clutch transmission according to FIG. 3) by means of the operating device 20 and/or a switch condition for switching the change speed transmission 5 into neutral position, which is dependent on operating parameters of the vehicle 1 and is tested by the control device 15, is satisfied. The term neutral position hereby means an operating state of the respective change speed transmission 5 in which no gear is activated, i.e., the coupling devices 6 (torque converter according to FIG. 2 and dual clutch according to FIG. 3) and the wheels 2-1, 2-2, 3-1, 3-2 do not experience a force transmission via the change speed transmission 5. This neutral position can either be requested by the driver by means of the operating device 20 (usually via the symbol "N") or fully automatically by the control device 15 and independent of the driver. For example for reducing consumption of propulsion energy (fuel or electrical energy) the control device 15 may determine that in the absence of a torque request by the driver it is advantageous to cause the change speed transmission 5 to assume a neutral position in order to increase the distance traveled by the vehicle in a rolling mode.

According to this aspect of the method however the request by the driver to put the change speed transmission 5 into a neutral position is not followed and a gear is nevertheless engaged by the control device 15. This serves for accelerating the heating process of the fluid.

In the following a further exemplary embodiment is explained in more detail by way of FIG. 4.

In this exemplary embodiment the second torque transmission device 13 is configured as a differential gear or as a differential of known construction. The differential 13 serves for permitting speed differences at the wheels of the rear axle without tensions occur in the drivetrain. Due to the fact that the construction of such a differential is known form the state of the art a detailed representation of all components that are required for the function of the differential are not given. Rather FIG. 4 shows the gearwheels of the differential 13 as block 13-1. For lubrication and cooling the involved gearwheels of the differential 13-1 at least one of the rotating elements splashes in a fluid 13-2 that is preferably an oil.

Figure 4:
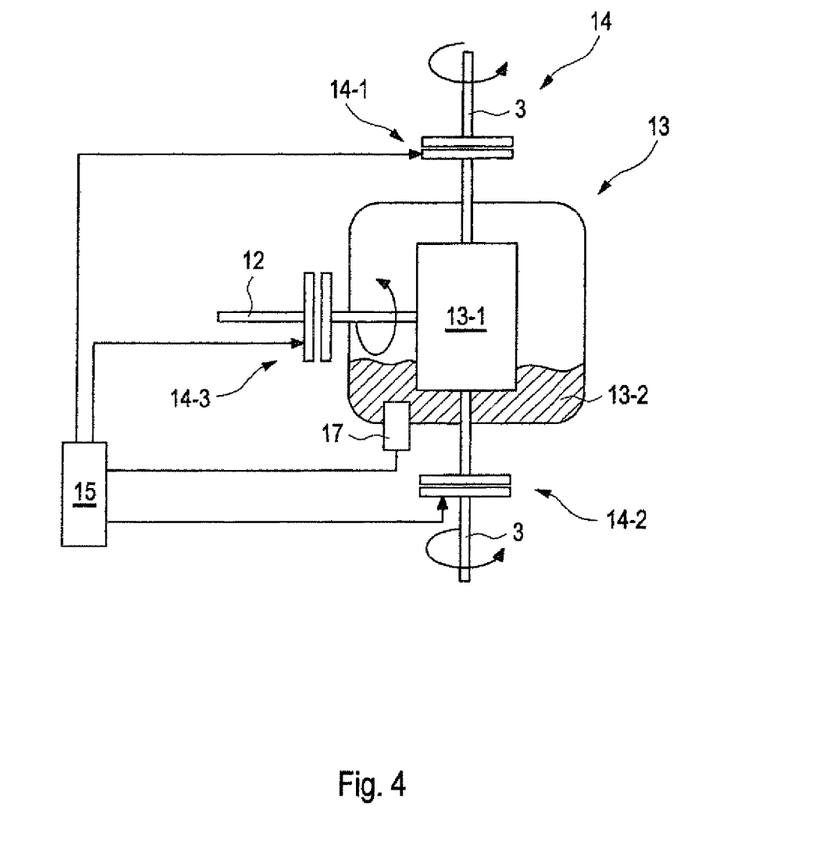

The second coupling device 14 that is assigned to the differential 13 has in the exemplary embodiment of FIG. 4 three controllable clutches 14-1, 14-2, 14-3 which are preferably configured as friction clutches or positive clutches. By means of electrical, pneumatic or hydraulic actuators (not shown) these clutches 14-1, 14-2, 14-3 can be selectively opened or closed by the control device 15.

According to the operating method for the vehicle 1, in an operating state (vehicle moves) in which no torque request by the driver is present and the driving speed of the vehicle 1 is below the predetermined speed threshold value, the differential 13 is connected by means of the clutches 14-1, 14-2, 14-3 with the wheels of the rear axle 3 and/or the front axle 2 for torque transmission. For coupling with the wheels 3-1, 3-2 of the rear axle 3 only the clutches 14-1, 13-2 that are assigned to the subaxles have to be closed. For coupling with the wheels 2-1, 2-2 of the front axle 2 alternatively or additionally also the clutch 14-3 that is arranged on the connecting shaft 12 can be closed. As a result in this operating state in which the vehicle rolls the rotating elements of the differential 13, which are now connected with the wheels 2-1, 2-2, 3-1, 3-2 for torque transmission are carried along, are caused to rotate and are accelerated to higher rotational speeds. In each case an increased displacement work of the rotating parts in the fluid results and a faster heating up.

When the vehicle speed is equal to or greater than the speed threshold value the clutches are opened again in order to enable that the only rolling, i.e., workless, vehicle can travel over a greater distance.

In the method it can be advantageous to couple the torque transmission devices in the mentioned operating states with at least one wheel of the vehicle only when a temperature assigned to the vehicle, in particular a coolant temperature, an oil temperature or the temperature of the fluid of the torque transmission device, is below a predetermined temperature threshold value. This temperature threshold value can be in the range between 70- and 90 degrees. When the temperature is greater than or equal to the temperature threshold value the torque transmission devices are decoupled from the wheels of the vehicle.

The method has the advantage of quickly heating up the fluids of the torque transmission devices and as a result significantly reducing losses due to displacement work. The hereby performed coupling of the torque transmission devices with the wheels of the vehicle however is limited to a speed range below a speed threshold value in the range of the speed limits within city limits (i.e., between 40-60 km/h). Due to the traffic conditions, the course of the roads, traffic signs and traffic lights within city limits it is only rarely possible to travel over longer distances solely by rolling, i.e., without propulsion by the internal combustion engine. For this reason it would be a significant impediment for the driver when due to the coupling of the torque transmission device and the wheels and the associated higher losses the theoretically traveled distances with rolling vehicle are shortened. At the same time however the advantage results of a noticeably faster heating up of the fluids in the torque transmission devices and noticeable reduction of the splash losses. Outside city limits when the driving speed of the vehicle is usually above the speed threshold value the likelihood to travel over greater distances solely by rolling of the vehicle is greater so that in this case the torque transmission device is not coupled with the wheels.

The invention claimed is:
1. A method for operating a vehicle, said vehicle having at least one torque transmission device which when rotating splashes in a fluid, at least two axles each having at least two wheels and at least one controllable coupling device adapted for selectively coupling or decoupling the torque transmission device with at least one of the wheels, said method comprising:

in an operating state in which no torque is requested by a driver of the vehicle, decoupling the torque transmission device and the at least one wheel when a driving speed of the vehicle is greater than or equal to a predetermined speed threshold value and coupling with the control device the torque transmission device and the at least one wheel for torque transmission when the driving speed is smaller than the predetermined speed threshold value and a temperature of the fluid is smaller than a predetermined temperature threshold value, wherein the coupling device has an automated change speed transmission and the at least one torque transmission device is assigned to the automated change speed transmission for coupling the change speed transmission with a drive unit of the vehicle for torque transmission, wherein the torque transmission device is configured for selectively coupling and decoupling the change speed transmission with the drive unit, and further comprising in the operating state in which no torque request by the driver is present, controlling the at least one controllable clutch so that the change speed transmission and the drive unit are decoupled.

2. The method of claim 1, wherein the at least one torque transmission device is configured as a differential gear.

3. A method for operating a vehicle, said vehicle having at least one torque transmission device which when rotating splashes in a fluid, at least two axles each having at least two wheels and at least one controllable coupling device adapted for selectively coupling or decoupling the torque transmission device with at least one of the wheels, said method comprising:

in an operating state in which no torque is requested by a driver of the vehicle, decouplinq the torque transmission device and the at least one wheel when a driving speed of the vehicle is greater than or equal to a predetermined speed threshold value and coupling with the control device the torque transmission device and the at least one wheel for torque transmission when the driving speed is smaller than the predetermined speed threshold value and a temperature of the fluid is smaller than a predetermined temperature threshold value, wherein the coupling device has an automated change speed transmission and the at least one torque transmission device is assigned to the automated change speed transmission for coupling the change speed transmission with a drive unit of the vehicle for torque transmission, wherein the torque transmission device is configured for selectively coupling and decoupling the change speed transmission with the drive unit, and wherein the at least one controllable clutch is configured as a friction clutch and is caused to assume a slip state when the driving speed is below the predetermined speed threshold value.

4. A method for operating a vehicle, said vehicle having at least one torque transmission device which when rotating splashes in a fluid, at least two axles each having at least two wheels and at least one controllable coupling device adapted for selectively coupling or decoupling the torque transmission device with at least one of the wheels, said method comprising:

in an operating state in which no torque is requested by a driver of the vehicle, decoupling the torque transmission device and the at least one wheel when a driving speed of the vehicle is greater than or equal to a predetermined speed threshold value and coupling with the control device the torque transmission device and the at least one wheel for torque transmission when the driving speed is smaller than the predetermined speed threshold value and a temperature of the fluid is smaller than a predetermined temperature threshold value, wherein the coupling device has an automated change speed transmission and the at least one torque transmission device is assigned to the automated change speed transmission for coupling the change speed transmission with a drive unit of the vehicle for torque transmission, and wherein the torque transmission device has at least one torque converter.

5. A method for operating a vehicle, said vehicle having at least one torque transmission device which when rotating splashes in a fluid, at least two axles each having at least two wheels and at least one controllable coupling device adapted for selectively coupling or decoupling the torque transmission device with at least one of the wheels, said method comprising:

in an operating state in which no torque is requested by a driver of the vehicle, decoupling the torque transmission device and the at least one wheel when a driving speed of the vehicle is greater than or equal to a predetermined speed threshold value and coupling with the control device the torque transmission device and the at least one wheel for torque transmission when the driving speed is smaller than the predetermined speed threshold value and a temperature of the fluid is smaller than a predetermined temperature threshold value, wherein the coupling device has an automated change speed transmission and the at least one torque transmission device is assigned to the automated change speed transmission for coupling the change speed transmission with a drive unit of the vehicle for torque transmission, and further comprising engaging a gear of the change speed transmission for a torque transmitting coupling of the torque transmission device and the at least one wheel.

6. The method of claim 5, wherein the gear has a greatest possible transmission ratio.

7. The method of claim 5, wherein the gear is also engaged when the driver selects a neutral position of the change speed transmission with an operating device or when a switching condition for switching the change speed transmission into the neutral position is satisfied, wherein the switching condition is dependent on operating conditions of the vehicle and is verified by a control device assigned to the change speed transmission.

* * * * *

UNITED STATES PATENT AND TRADEMARK OFFICE
CERTIFICATE OF CORRECTION

PATENT NO. : 10,189,459 B2
APPLICATION NO. : 15/309730
DATED : January 29, 2019
INVENTOR(S) : Andreas Kopp It is certified that error appears in the above-identified patent and that said Letters Patent is hereby corrected as shown below:

On the Title Page

Item [73] Assignee:
Replace "AUDI AG, Ingolstadt, München" with --AUDI AG, Ingolstadt (DE)--.

Signed and Sealed this
Fifteenth Day of September, 2020

Andrei Iancu
*Director of the United States Patent and Trademark Office*